United States Patent Office 3,814,583
Patented June 4, 1974

3,814,583
METHOD AND APPARATUS FOR ANALYZING
ORGANIC CARBON IN AQUEOUS SYSTEMS
William John Miller, Belle Mead, and Hartwell Forrest
Calcote, Princeton, N.J., assignors to Aerochem Research Laboratories, Inc.
Filed June 7, 1972, Ser. No. 260,500
Int. Cl. G01n 31/12, 33/18
U.S. Cl. 23—230 R          13 Claims

ABSTRACT OF THE DISCLOSURE

Organic carbon in an aqueous medium is burned and detected in a flame ionization unit in which the water undergoing analysis is atomized to a fine spray. The fine water spray passes into the combustion zone of a hydrogen flame where the organic carbon compounds are ionized. The ionized carbon compounds are detected by a collection electrode which is connected to an electronic circuit. Ion exchangers are used to remove inorganic materials, such as, alkali metal salts which interfere with the analysis, from salt-containing water.

CROSS REFERENCE TO RELATED APPLICATION

None.

BACKGROUND OF THE INVENTION

This invention relates generally to the measurement of total oxidizable organic carbon in an aqueous medium, and more particularly, to a flame ionization method and apparatus for continuously detecting and measuring the amount of oxidizable organic carbon in water. The invention may be used in measuring organic matter in raw water or partially treated water, but it is especially adaptable for use in measuring organic contamination in water substantially free of inorganic salts.

The organic contaminants or matter capable of detection and measurement by the apparatus and method of the present invention are organic or carbonaceous matter which contain oxidizable organic carbon. Oxidizable organic carbon is carbon which is capable of being oxidized. The oxidation results in the formation of ions which are capable of being detected by an electronic circuit. Oxidizable organic carbons exclude carbon dioxide, carboxylic acid groups and all C=O moieties of organic compounds.

Organic contamination in water can cause many problems when it is present in water in concentrations even as low as several parts per billion, e.g., 20–50 p.p.b. In some industrial applications, such as, in the semi-conductor electronics industry, ultrapure water is used as a cleaning agent to wash delicate microminiature electronic components. Sensitive detectors are needed to monitor the organic contaminants in the water in order to keep them below the level which might compromise the quality of the electronic components. Present organic detectors are not capable of detecting organic substances in water in concentrations low enough to provide a continuous indication of the level of organic contaminants in ultrapure water.

Organic contamination detectors are also used in determining the amount of organic contamination in streams, lakes and other bodies of water. Simple and economical detectors capable of sustained and immediate measurement of organic compounds in water are not presently available for monitoring such water supplies.

The measurement of organic matter in water is well known in the art. Organic matter in water may be determined by sampling from a particular source and subjecting the sample to chemical tests in which the organic constituents are oxidized by various chemical reagents. However, these testing techniques are merely spot analyses and no not provide a continuous, sustained means of analyzing for organic carbon content of water.

Continuous methods and apparatuses for measuring organic matter in water are also known. For example, in U.S. 3,205,045 Von Lossberg discloses an apparatus for continuously measuring the organic content of a flowing stream of water by converting the organic contaminants to carbon dioxide and either measuring the amount of carbon dioxide by measurement of the electrical conductivity of the test sample or measuring carbon dioxide through coulombmetric measurement, automatic titration, or colorimetric techniques. However, unless complicated steps are taken to measure parallel or dual samples of the main stream, and compare samples not vaporized and oxidized for dissolved carbon dioxide content with those which are vaporized and oxidized to convert organic matter to carbon dioxide, the measurement of the water according to the Von Lossberg apparatus is an indication of not only the organic matter, but also dissolved carbon dioxide. Thus, organic matter in water is determinable by a continuous method, but only by analysis utilizing dual streams.

Other methods and apparatuses for determining the carbon content of aqueous systems are also known. The amount of carbonaceous material may be determined by the amount of oxidant consumed which may be found volumetrically or photometrically, or by the quantity of carbon dioxide evolved which may be determined by manometric, gravimetric or alkalimetric procedures or by thermo-conductivity and mass spectrometery, and the like. Examples of methods in which converted carbon dioxide is measured, are found in U.S. 3,296,435; U.S. 3,322,504; U.S. 3,346,342 and U.S. 3,567,388. Most presently available carbon analyzers monitor carbon dioxide by means of infra-red absorption spectrometery. However, unless steps are taken to exclude dissolved carbon dioxide or unless water containing no dissolved carbon dioxide is measured, measurements therein are a function of both organic matter and dissolved carbon dioxide. Furthermore, most of the prior art equipment, e.g. infra-red absorption spectrophotometers, required to measure the carbon dioxide is complex and therefore, it is relatively expensive to build and difficult to manipulate. These devices are also generally limited to detecting organic substances in water at concentrations only as low as a few parts per million.

Analytical instruments are also known where an atomized sample or fine spray is burned in a flame, for example, in a pure hydrogen flame. In U.S. 3,592,608 White discloses an instrument wherein the material to be analyzed is atomized and passed through a burner where the material is burned and analyzed. However, the analysis is made by a light sensitive detection system responsive to characteristics of the flame. Flame photometry and atomic absorption spectrophotometry units generally comprise aspirator or venturi feed systems, which produce an atomized spray which is burned in a hydrogen flame, however, these systems are also characterized by detectors which are light sensitive and thereby dependent upon optical characteristics of the flame.

Flame ionization detectors are used in the effluent of gas chromatographic columns to detect organic content therein by chemi-ionization. In gas chromatography the sample is vaporized, passed through a separation column and burned in a hydrogen flame. Chemi-ions induced by the burning of the hydrocarbons which are emitted from the column in the form of pulses, are measured by an electronic circuit.

However, even if the separation column is removed in which case the aqueous sample is simply vaporized and passed directly into the flame, conventional gas chromatography systems are unsatisfactory for determining the organic carbon content in aqueous systems due to the fact that the organic material in the water frequently comprises large molecules which are destroyed by the temperature of vaporization. Also, the sensitivity of the gas chromatographic flame is such that the low organic content of aqueous samples, and particularly of ultrapure water samples, does not produce sufficient current for detection of the chemi-ions. Furthermore, samples of the type required for analysis of the organic carbon content of aqueous systems comprise sufficient water to extinguish the flame of conventional flame ionization detectors used in gas chromatography.

OBJECTS OF THE INVENTION

Accordingly, it is the primary object of this invention to provide a method and apparatus for continuously measuring the oxidizable organic carbon content of an aqueous system.

Another object of this invention is to provide for immediate and sustained detection and measurement of oxidizable organic carbon in water.

Another object of this invention is to provide a detection and measurement system for analyzing water for concentrations of organic carbon content as low as 40 parts per billion or less.

Still another object of this invention is to provide a total carbon analyzer which is relatively inexpensive to build and simple to operate.

Another object of this invention is to provide a flame ionization method and apparatus for measuring the oxidizable organic carbon in an aqueous system wherein the organic material will not be destroyed prior to burning in the flame.

Yet another object of this invention is to provide a flame ionization method and apparatus for measuring the oxidizable organic carbon in an aqueous system wherein the current produced in the electronic circuit is sufficient to detect the chemi-ions produced by the hydrocarbons even in ultrapure water and wherein the water content of the sample does not extinguish the flame.

Further objects and features of the invention will be apparent from the following description taken in conjunction with the accompanying drawings.

SUMMARY OF THE INVENTION

In accordance with the invention oxidizable carbon content in an aqueous system is determined by atomizing the sample and burning the atomized sample in a flame to produce electronically detectable chemi-ions. The oxidizable organic carbon detector of this invention comprises a burner assembly having a burner head for producing a flame, gas inlet means for supplying a combustion supporting gas and a combustible gas, said gas inlet means communicating with the burner head through a mixing chamber or conduit and an excess sample drain communicating with the gas inlet means; means for atomizing the aqueous sample as it enters the gas inlet means; a collection electrode located proximate the flame in the area of the burner head; and electronic means connected with the collection electrode for measuring changes in current caused by ionized organic carbon compounds drawn to the collection electrode.

The aqueous medium in the reservoir is drawn from the reservoir and atomized into a fine spray by suitable atomizing means. The fine spray is mixed with gas, preferably combustion supporting gas and a combustible gas, such as hydrogen gas, supplied through the gas inlet means, to form a premixed stream of the atomized aqueous medium and the gas where it passes into the burner head and ignites in the flame produced by the burning of the gases. When hydrogen gas and combustion supporting gas are supplied to the gas inlet means, the organic material in the atomized aqueous medium ignites in a hydrogen flame produced by the burning of hydrogen in the combustion supporting gas. As the oxidizable organic materials burn, they produce ionized carbon compounds or "chemi-ions" and electrons both of which may also be designated as ionized particles, which are attracted to and detected by the collection electrodes. The "chemi-ions" (or electrons) detected by the collection electrode are measured by an electronic means which may also record the responses of the collection electrode to the chemi-ions. Changes in current on the collection electrode are thus proportional to the concentration of the organic substances in the water. Thus, by using an atomizer burner assembly to produce chemi-ions from oxidizable organic material in an aqueous medium and by using a flame ionization detector to detect and measure the chemi-ions, we have discovered a method for detecting and measuring the oxidizable organic carbon content of water even in concentrations as low as 40 parts per billion or less as in ultrapure water. Furthermore, this method can be continuous and is immediately responsive to changes in the oxidizable organic carbon content of the water sample.

Since the flame ionization detector is affected by and measures inorganic salts present in the water, we have also found that in cases where such inorganic salts are present in the aqueous medium, it is necessary to treat the water with a suitable ion removal device such as an ion exchange column or an electrodialytic apparatus and the like, to remove the inorganic salts prior to atomization of the aqueous medium.

In accordance with the objects of our invention we have discovered a method for continuously determining the oxidizable organic content of an aqueous medium containing carbonaceous (organic) matter free of inorganic salts by passing a continuous stream of the aqueous medium into an atomizer thereby converting the aqueous medium into a fine aqueous spray or mist containing carbonaceous material; passing a stream of combustible gas and a stream of combustion supporting gas into a burner head and igniting the combustible gas to produce a flame; mixing the fine aqueous spray containing carbonaceous matter with the combustion supporting gas and combustible gas to form a mixture of aqueous spray and gases to induce the formation of chemi-ions from the carbonaceous matter and water vapor from the aqueous moiety; and detecting the chemi-ions by means of a flame ionization detector having a collection electrode and electronic means for sensing and measuring the chemi-ions.

As used herein the term fine spray may be used interchangeably with atomized spray, aerosol spray, fine aqueous spray or mist and the like.

DESCRIPTION OF THE PREFERRED EMBODIMENTS

Figure 1:
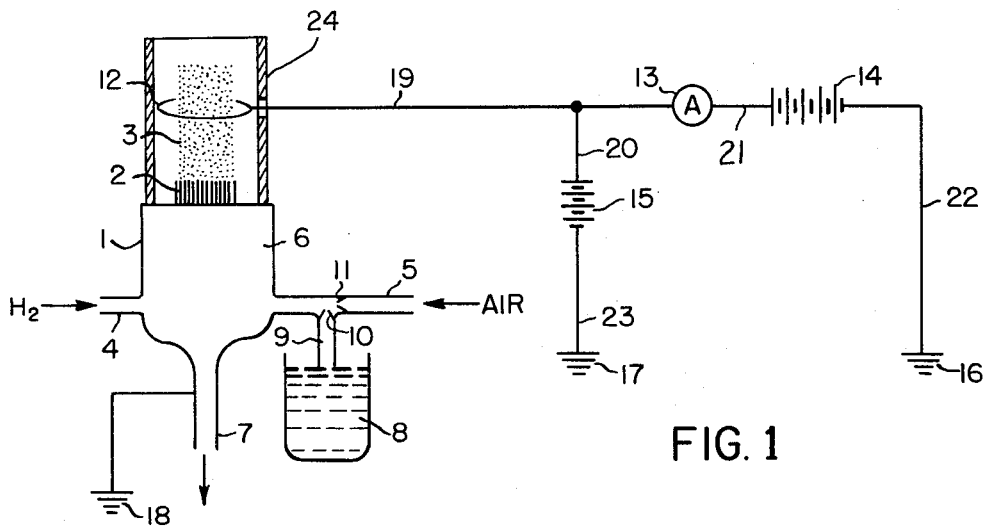
FIG. 1 shows a diagrammatical view of the flame ionization detector, burner assembly and atomizing means.

In FIG. 1, numeral 1 represents a burner assembly having a burner head designated by numeral 2, a hydrogen gas inlet designated by numeral 4 and a combustion supporting gas inlet designated by the numeral 5. Hydrogen gas inlet 4 and combustion supporting gas inlet 5 communicate with burner head 2 through a mixing chamber designated by numeral 6. Mixing chamber 6 may be any suitable configuration including a conduit to carry hydrogen gas and combustion supporting gas to the burner head. Mixing chamber 6 is provided with an excess sample drain designated by numeral 7. Excess sample drain 7 leads from the interior of the mixing chamber to the exterior of the mixing chamber for the discharge of sample which accumulates within the mixing chamber and does not pass through burner head 2. Excess sample drain 7 generally comprises means (not shown) e.g., a valve or trap device, for preventing the communication of the interior of the mixing chamber with the exterior in order to prevent the escape of gases during operation of the unit.

Atomizing means designated by numeral 10 is shown as the restricted end of a conduit designated by numeral 9 which communicates with a sample reservoir designated by numeral 8 and the combustion supporting gas inlet 5. A restriction designated by numeral 11 is shown in combustion supporting gas inlet 5 near the area of restriction 10 in conduit 9. As combustion supporting gas passes through combustion supporting gas inlet 5 and restriction 11, it causes a suction effect upon conduit 9 and thereby causes the sample in the reservoir 8 to pass through conduit 9 to atomizing means 10 where the sample is converted to an atomized or fine spray in combustion supporting gas inlet 5. The atomized spray is carried by combustion supporting gas into mixing chamber 6 where it is mixed with hydrogen gas and exits through burner head 2 where the hydrogen gas is ignited and produces a hydrogen flame designated by numeral 3. The atomized spray carried by the hydrogen gas and combustion supporting gas passes into flame 3 where water contained therein is vaporized, and oxidizable organic carbon contained therein is ionized to chemi-ions.

An electrified collection electrode means, designated by numeral 12, is located proximal flame 3 in the area of burner head 2. Collection electrode 12 as shown is placed on the perimeter of the flame in cool surrounding gas. However by adapting the electrode to withstand the high temperature of the flame the electrode may be placed within the flame (not shown). Collection electrode 12 is connected to an electrometer, designated by numeral 13, or any other current measuring device by a wire designated by numeral 19. In the embodiment shown in FIG. 1 a power supply is designated by numeral 14 and a direct current source, such as a battery, designated by numeral 15, is used for background suppression. Numerals 16, 17 and 18 are used to designate ground wires and numerals 20, 21, 22 and 23 are used to designate wires for connecting elements of the electronic circuit. In the preferred embodiment the power supply should provide a bais potential of between about 100 and 300 volts on the collection electrode. Although it is not shown electrometer 13 and power supply 14 and direct current source 15 may be replaced by alternating current measuring and bias generating devices respectively.

Since the response to the detector is relatively insensitive to the location of the collecting electrode, the electrode must only be close enough to the flame to provide a sufficient electrical field for the withdrawal of ions (electrons) as they are formed. When the bias potential on the electrode is between about 100 and 300 volts, the electrode may be placed on the perimeter of the flame in the cool surrounding gas. This arrangement of the electrode avoids the necessity of special high temperature materials and precludes thermionic emission from the collector. Generally, if the bias voltage is maintained below about 100 volts, all of the ions formed in the flame may not be collected, however, this depends upon the geometry of the electrode. When the potential on the electrode exceeds about 300 volts, insulation problems and electrical breakdown may occur, again a factor influenced by the geometry of the electrode configuration. Accordingly, the bias voltage may be adjusted beyond the preferred limits, and one skilled in the art can make suitable adjustments thereof corresponding to the geometry or configuration of the electrode.

It is preferred that "zero" grade air and hydrogen, both commercially available for flame ionization detectors, be used as combustion supporting gas and combustible or fuel gas respectively in order to reduce the background signal and to promote reproducibility. Even though purified hydrogen and purified combustion supporting gas, such as air or oxygen, are used in the method and apparatus of the present invention, the hydrogen and air flame still produces a small detectable signal due to the formation of small concentrations of ions therefrom. A stable flame background is provided by using a direct current source for background suppression. The degree of sensitivity available is dependent basically on how small a signal is detectable which in turn depends on the stability of the background signal. Any gas which does not produce chemi-ions or interfere with the burning of the sample may be used in the apparatus and process of this invention. For example, gases which do not produce chemi-ions are CO, $H_2S$, $CS_2$ and the like. Combustible gas as used herein is any fuel gas capable of burning and which will not interfere with the formation or detection of the chemi-ions produced by the burning of the oxidizable organic carbon. Examples of combustible gases are hydrogen, carbon monoxide, carbon disulfide, hydrogen sulfide, and the like and mixtures thereof. It is also within the scope of the present invention to utilize mixtures of inert carrier gases with either the combustible gas or combustion supporting gas in quantities or concentrations which will not interfere with the maintenance of the flame and in purities which will not contribute to interference of the detection and measurement of the chemi-ions produced from the oxidizable organic carbon content of the aqueous medium undergoing testing.

Since the detector is also sensitive to air drafts and currents as well as to perturbations in the fuel gas supplies, the flame and collection electrode should be shielded as well as possible from such drafts and air currents. This is accomplished preferably by adding a chimney 24 in the area of the burner head to shield the flame and the collection electrode.

The atomizing means and combustion supporting gas inlet (in certain embodiments combined with the combustible gas inlet) is preferably an aspirator wherein gas passing over a restricted opening in a conduit leading from a reservoir into the gas inlet produces a vacuum and thereby causes sample to pass through the restricted end of the conduit where the sample forms a fine mist or atomized spray in the gas. The aspirator feeds the fine mist of the liquid sample into the combustion supporting gas or in some cases into a premixed combustion supporting gas and combustible gas stream. Other means, e.g., a suitable positive displacement pump, may also be used for converting the liquid sample into an aerosol or atomized spray prior to mixing the spray with the combustion supporting gas and/or hydrogen gas. Although it is not shown in the drawing the intake of the positive displacement pump communicates with conduit 9 which extends into sample reservoir 8. A spray nozzle to produce an atomized or fine spray communicates with the discharge outlet of the pump. When this embodiment is used to produce the fine spray, the spray nozzle may be located at any place in the burner assembly where there will be effective distribution of the fine spray in the combustion supporting gas and/or combustible gas. Thus, for example, the spray nozzle may be located in mixing chamber 6 (not shown). In a preferred embodiment the gas mixture of atomized sample, hydrogen, and combustion supporting gas, and possibly other gases which do not interfere with the detection of the oxidizable organic carbon, is then fed through the burner head where it is burned, preferably on a matrix, in a Meker type flame close to the sensing electrode. Carbon-containing material is released into the flame upon evaporation of the aerosol or atomized spray and gives rise to ionization by the chemi-ionization phenomenon associated with hydrocarbon combustion. Specificity limitations of the method and apparatus of the present invention are similar to those of conventional flame ionization detectors used in gas chromatography insofar as carbonyl groups, CO, $CO_2$, etc. do not contribute to the ionization and accordingly, are not measured. However, this lack of sensitivity to carbon dioxide is of considerable advantage in water analysis because the large quantities of carbon dioxide normally present in water are a source of irritation and error in conventional carbon analyzers using combustion followed by non-dispersive infrared determination of carbon dioxide.

In another embodiment of the present invention (not shown) combustion supporting gas and combustible gas (hydrogen) are premixed or combined at suitable flow rates upstream from the aspirator, and separate combustible gas and combustion supporting gas inlets leading into the mixing chamber are eliminated. Thus, combustible gas inlet 4 and combustion supporting gas inlet 5 may be combined to provide means for pre-mixing the gases before the gas passes through restriction 11. If there is proper mixing of the gases and atomized spray in the conduit downstream from the atomizing means, the conduit may be sufficient as the mixing chamber. Thus, the mixing chamber may comprise the conduit leading from the atomizing means to the burner head.

Gas inlet means as used herein may be any embodiment wherein combustion supporting gas and combustible gas or mixtures thereof are introduced into the apparatus and comprise the gas inlets as described in FIG. 1, the gas inlets combining both combustion supporting gas and combustible gas upstream from the atomizing means where both types of gases pass through the venturi and thereby cause sample to pass through the restricted end of the conduit where the sample forms an atomized spray.

It is to be understood that one skilled in the art can adjust the flow rates of the gases so that there is suitable mixing of the gases, a suitable flame in which the oxidizable organic compounds can burn and/or a properly atomized liquid sample containing the organic carbon to be detected. The gas streams may comprise mixtures of gases which do not interfere with the analysis and which do not produce chemi-ions when subjected to burning.

It is generally recommended that an excess sample drain be provided in the burner assembly to remove accumulations of atomized spray which do not pass through the burner head but which collect in portions of the mixing chamber. The aqueous moiety of the atomized spray which passes through the burner head into the flame is generally converted into water vapor and passes into the atmosphere.

EXAMPLE

In an instrument essentially as described in FIG. 1 using "zero" grade air and hydrogen, a 1 cm. diameter flame and a 2 cm. ring electrode placed 2 cm. downstream of the burner head a sample of an organic carbon source in an aqueous medium was analyzed for organic carbon content. The potential imposed by using a B-voltage power supply was between 150 and 180 volts, over which range no variation in detector response was observed. An electrometer was used as an ammeter to detect the signal. The background was subtracted from the signal with a highly stable DC power supply (battery). The aspirator rate was approximately 1–3 ml. per min. water. The determination was made on isopropyl alcohol in water.

Figure 2:
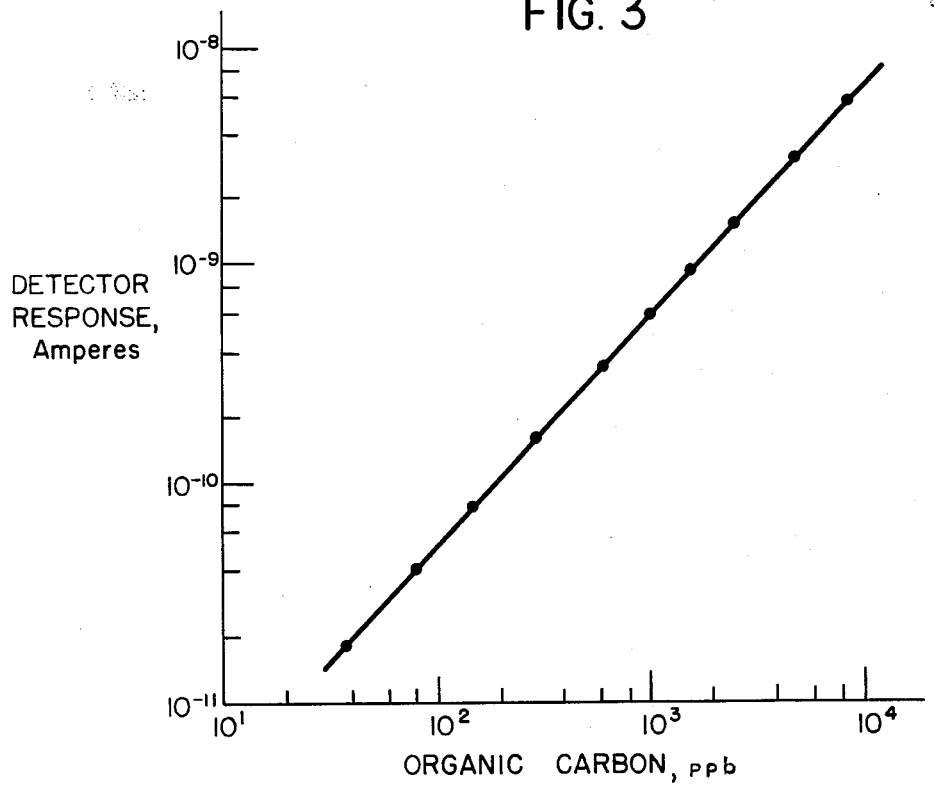
FIG. 2 shows a graphical representation of the concentrations of organic carbon in relation to detector response for the measurement of oxidizable organic carbon in water measured in accordance with the process and apparatus of the present invention.

The graph in FIG. 2 represents the measurement of various concentrations of isopropyl alcohol in water in relation to the detector response in amperes. In the graph $10^2$ represents 100 parts per billion (p.p.b.) and $10^3$ represents 1000 p.p.b. The lowest concentration of added organic carbon shown in the graph and representing the amount of isopropyl alcohol in water is 40 p.p.b.

The signal produced by the addition of 40 p.p.b. carbon (as isopropyl alcohol) in the data of FIG. 2 was approximately 3 times larger than the noise accompanying the flame background. Thus, concentrations as low as 20 p.p.b. can be easily detected in the instrument of FIG. 1.

Oxidizable organic carbon in water has also been determined in the apparatus shown in FIG. 1 for methyl alcohol, ethyl alcohol, butyl alcohol, toluene, toluol, acetic acid, and methane dissolved in water and various mixtures thereof.

Figure 3:
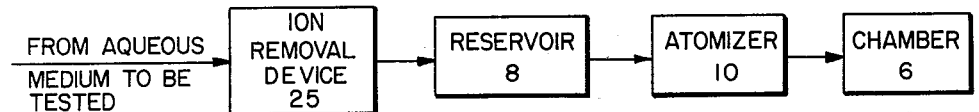
FIG. 3 is a block diagram illustrating the steps of the present invention.

Aqueous systems containing even small amounts of inorganic cations produced from such materials as alkali metal salts cause a current output when burned in a flame which swamps the signal produced by the oxidizable organic carbons present in the aqueous system. These alkali metal compounds, such as sodium chloride, potassium chloride and the like are almost always present in surface or well water. To analyze the oxidizable organic carbon these salts must be removed without altering the hydrocarbon fraction. This can be accomplished by passing the samples through a suitable ion removal device 25 (FIG. 3) This ion removal device may be a column of cation exchange material, an electrodialtyic apparatus or any other device capable of removing the undesirable ions from the aqueous sample. Ion exchange resins including certain synthetic organic ion exchange resins which do not remove organic materials from or add organic materials to the water and which remove undesirable ions therefrom may be used to treat the water. Any aqueous system may be analyzed for oxidizable organic carbon content as long as the interfering ions can be removed therefrom and as long as the aqueous system can be atomized into a fine spray. Water containing inorganic materials which ionize when burned to form ions must be treated with the ion removal device prior to the formation of the atomized spray.

The apparatus of this invention may be modified by adding certain features such as an ignition system for igniting the hydrogen flame in the area of the burner head.

The detector may be any electronic circuit, operating with alternating and/or direct current, capable of detecting and/or amplifying the response to the chemi-ions. A recording device may be incorporated therein to provide a method of continuously recording responses of the instrument to the ionized organic carbon (chemi-ions). Examples of detector circuits which may be used as the ionization detector in the present invention, are shown in U.S. 3,129,062 and U.S. 3,298,788. It is within the purview of one skilled in the art to provide a suitable detecting, amplifying and recording circuit for use in the present invention.

An inexpensive method and apparatus for measuring the oxidizable organic carbon content of an aqueous system has been provided in accordance with the objects of the present invention. Continuous, immediate and sustained detection and measurement of oxidizable organic carbon in water can be carried out on water samples in which the oxidizable organic carbon content is only a few p.p.b., in accordance with the process and apparatus of the present invention. The use of atomizing means, a burner head assembly, a collection electrode and an electronic detection device in accordance with our invention produces an unexpected synergistic effect which permits either the interrupted or continuous measurement and monitoring of oxidizable organic carbon content of aqueous systems including samples of ultrapure water.

It is to be understood that although the invention has been described with specific references to particular embodiments thereof it is not to be so limited, since changes and alterations therein may be made which are in the full intended scope of this invention as defined by the appended claims.

We claim:

1. A flame ionization detector for determining the oxidizable organic carbon content of an aqueous medium comprising in combination:
   (a) a burner assembly having a mixing chamber, a burner head communicating with said chamber to produce a flame, a first gas inlet means for supplying combustion supporting gas to said mixing chamber, a second gas inlet means for supplying combustible gas to said mixing chamber, and an excess sample drain communicating with said chamber;
   (b) a sample reservoir for containing said aqueous medium communicating with one of said gas inlet means by a conduit;
   (c) atomizing means for converting the aqueous medium into a fine spray as it enters said one gas inlet means;
   (d) a collection electrode located proximal the burner head; and
   (e) electronic means connected with said collection electrode for measuring changes in current on said collection electrode caused by ionized organic carbon compounds, whereby the aqueous medium containing oxidizable organic material atomized by said atomizing means and mixed with combustion supporting gas and combustible gas is burned in a flame produced by said gases to produce ionized organic carbon compounds which are detected by said collection electrode and measured by said electronic means.

2. The apparatus of claim 1 wherein a bias potential of about 100 to about 300 volts is maintained on said collection electrode.

3. The apparatus of claim 1 wherein said atomizing means comprises a sample conduit having one end extending to the aqueous medium to be analyzed and the other end restricted and extending into a gas inlet conduit through which at least one of said gases passes and thereby creates a suction in said sample conduit.

4. The apparatus of claim 1 wherein a chimney surrounds the flame and collection electrode to stabilize the flame and to prevent detection of gases and vapors circulating in the atmosphere in the area of the flame.

5. The apparatus of claim 1 wherein an ion removal device is placed between the aqueous medium to be analyzed and the atomizing means to remove inorganic salts from the aqueous sample.

6. The apparatus of claim 5 wherein the ion removal device is a column of at least one ion exchange resin.

7. A method for continuously analyzing an aqueous medium for oxidizable carbon compounds comprising;
   (a) forming an atomized vapor of said aqueous medium;
   (b) mixing said atomized vapor with combustion supporting gas and combustible gas;
   (c) passing the mixture of vapor and gases into the combustion zone of a flame produced by the burning of said combustible gas in said combustion supporting gas where said oxidizable carbon compounds of said aqueous medium burn and thereby form ionized particles; and
   (d) detecting the ionized particles with electrified detection electrode means.

8. A method in accordance with claim 7 wherein said combustion supporting gas is selected from the group consisting of purified air and purified oxygen and said combustible gas is selected from the group consisting of purified hydrogen, purified carbon monoxide, purified carbon disulfide, purified hydrogen sulfide and mixtures thereof.

9. A method in accordance with claim 7 further comprising removing inorganic salt from said aqueous medium with an ion removal device prior to forming said atomized vapor.

10. A method in accordance with claim 9 wherein said ion removal device is an ion exchange resin of the type which promotes removal of inorganic salts without altering the oxidizable carbon content of the aqueous medium.

11. A method in accordance with claim 9 wherein said ion removal device is an electrodialytic apparatus.

12. A method for continuously determining the oxidizable organic content of an aqueous medium containing carbonaceous matter, free of inorganic salts, comprising:
   (a) passing a continuous stream of said aqueous medium into an atomizer thereby converting said aqueous medium to a fine aqueous spray containing carbonaceous material;
   (b) passing a stream of combustible gas and a stream of combustion supporting gas into a burner head and igniting said combustible gas to produce a flame;
   (c) mixing said fine aqueous spray containing carbonaceous matter with said combustion supporting gas and combustible gas to form a mixture of aqueous spray and gases;
   (d) burning said mixture of aqueous spray and gases to induce the formation of chemi-ions from said carbonaceous matter; and
   (e) detecting said chemi-ions by means of a flame ionization detector having a collection electrode and electronic means for sensing and measuring said chemi-ions.

13. A method in accordance with claim 12 wherein said combustible gas is selected from the group consisting of hydrogen gas, carbon monoxide gas, carbon disulfide gas, hydrogen sulfide gas and mixtures thereof and said combustion supporting gas is selected from the group consisting of air and oxygen.

References Cited
UNITED STATES PATENTS

| | | | |
|---|---|---|---|
| 3,567,391 | 3/1971 | Lysyj et al. | 23—230 PC |
| 3,592,608 | 7/1971 | White | 23—253 R |
| 3,607,070 | 9/1971 | Stenger et al. | 23—230 R |

ROBERT M. REESE, Primary Examiner

U.S. Cl. X.R.

23—254 EF